United States Patent [19]

Yano

[11] Patent Number: 4,472,275

[45] Date of Patent: Sep. 18, 1984

[54] MAGNETIC SEPARATOR

[75] Inventor: Junichi Yano, Aichi, Japan

[73] Assignee: Daidotokushuko Kabushikikaisha, Japan

[21] Appl. No.: 426,476

[22] Filed: Sep. 29, 1982

[30] Foreign Application Priority Data

Dec. 30, 1981 [JP] Japan ............................. 56-210752

[51] Int. Cl.[3] ......................... B01D 35/06; B03C 1/30

[52] U.S. Cl. ............................................. 210/223

[58] Field of Search ............... 210/222, 223, 243, 695; 55/3, 100; 204/155

[56] References Cited

U.S. PATENT DOCUMENTS 3,770,629 11/1973 Nolan ................................ 210/695

FOREIGN PATENT DOCUMENTS 154873 6/1979 Japan ................................ 210/222

*Primary Examiner*—Benoit Castel

*Assistant Examiner*—John W. Czaja

*Attorney, Agent, or Firm*—William A. Drucker

[57] ABSTRACT

A magnetic filter including a tubular case which has a filter region divided along a flow passage into two smaller-dimensioned spaces in each of which a filter element of magnetic material is located. A magnetic means is also provided in one of the two spaces. In the smaller-dimensioned space including the magnetic means, only a portion of the lines of magnetic force produced by an electromagnetic coil connected to the tubular case is allowed to magnetize the filter element disposed in the same space, while the remaining lines pass through the magnetic means, so that the filter element is magnetized to a lesser degree. However, the filter element located in the other smaller-dimensioned space is magnetized by all the lines of magnetic force so that the same space has a higher capacity for attracting magnetic particles. Therefore, different types of magnetic particles contained in a fluid are attracted by the lowly-magnetized filter element and the highly-magnetized one, respectively.

7 Claims, 7 Drawing Figures

MAGNETIC SEPARATOR

BACKGROUND OF THE INVENTION

1. Field of the Invention

This invention relates to devices for removing magnetic particles from fluids such as drainages from an iron mill or atomic power facilities, cooling fluid used in a iron mill, or the like.

2. Description of the Prior Art

Heretofore one of the devices widely used for removing magnetic particles from fluids has included a filter element in a flow passage for fluids, which element is adapted to be magnetized by an electromagnetic coil so that it is capable of attracting the particles. Such a device is a satisfactory means for attracting the particles of great size or susceptibility. However, it is necessary to use a larger-sized electromagnetic coil or apply a more amount of electric current to the coil in order to attract the particles of small size or susceptibility by such a conventional device. In such a case, the whole device is made a costly one or an increased consumption of electric power results.

SUMMARY OF THE INVENTION

It is an object of the invention to provide a magnetic separator which is capable of attracting magnetic particles of certain qualities in one filter region and those of other qualities in another filter region by varying the intensity of magnetic field produced in one filter region from that produced in the other filter region. That is, according to the invention, a fluid to be filtered is first allowed to pass a front filter element, and then a rear one so that the particles contained in the fluid, but not caught by the front element are attracted by the rear one. When the foregoing object is thus achieved, the capacity of the whole filter means for attracting the particles is increased or a more amount of the particles are attracted so that the number of washings of the filter elements required to treat a unit amount of fluid is reduced.

Another object of the invention is to provide a magnetic separator which is capable of producing a magnetic field of a certain intensity in one filter region and that of a different intensity in another filter region by using one electromagnetic coil of almost the same size as that used for producing a magnetic field of uniform intensities in the entire filter region in the separator (i.e., without using specially larger-sized coil therefor).

Still another object of the invention is to provide a magnetic separator which is capable of producing a magnetic field of a certain intensity in one filter region and that of a different intensity in another filter region by using the same magnetomotive force as employed for producing a magnetic field of medium intensity evenly in the entire filter region in the separator, i.e., applying only the same amount of electric current to the coil as required for producing the foregoing magnetic field of medium intensity.

Other objects and advantages of the invention will become apparent during the following discussion of the accompanying drawings.

DESCRIPTION OF THE PREFERRED EMBODIMENTS

Figure 1:
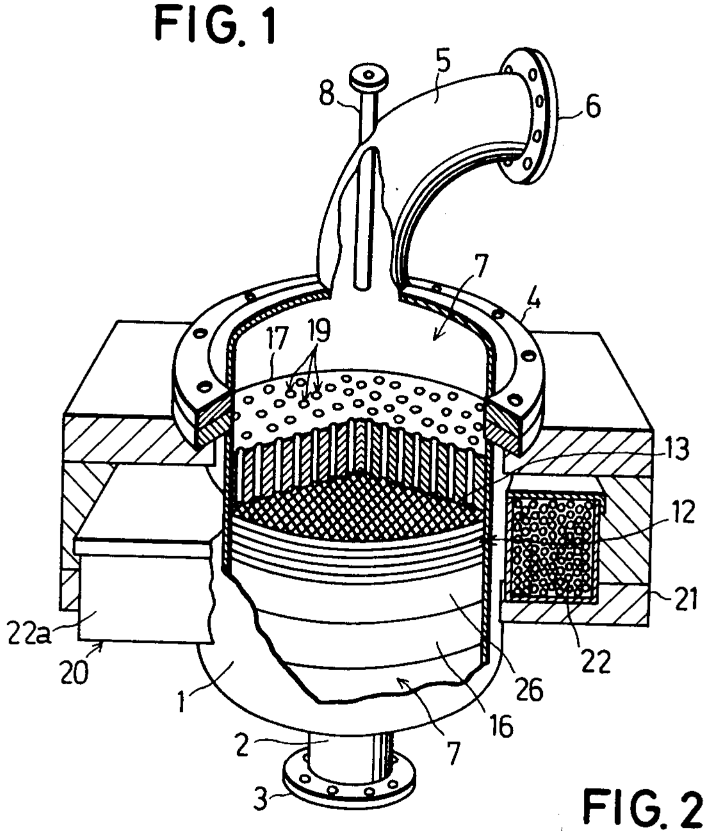
FIG. 1 is a partially-cutaway perspective view of a magnetic separator according to the invention.
Figure 2:
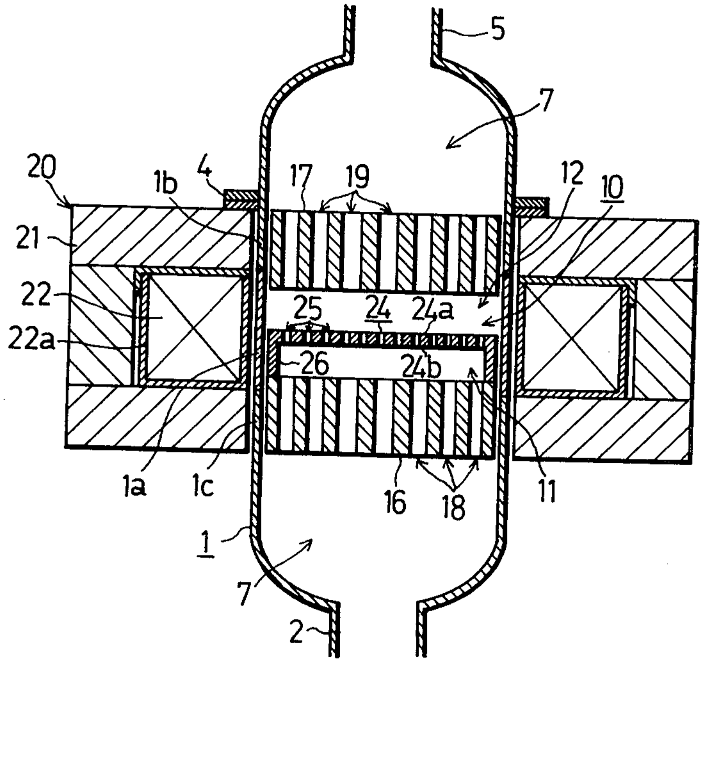
FIG. 2 is a vertical cross section of the separator of FIG. 1 wherein no filter element is shown.
Figure 3:
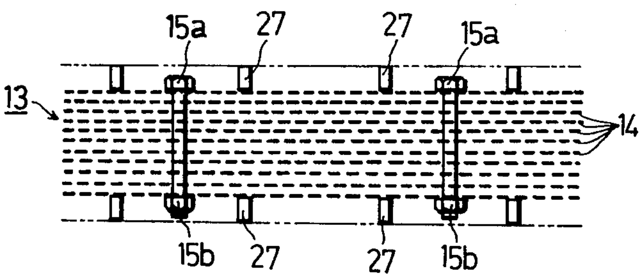
FIG. 3 is a elevational view of a filter element used in the separator of FIG. 1.

Referring to FIGS. 1 and 2, numeral 1 designates a tubular case of a magnetic separator. A pipe 2 is not only connected to the lower end of the case, but can be connected to a lower piping well known in the art (not shown) by means of a flange 3 so that the tubular case 1 is allowed to communicate with the lower piping. Also, another pipe 5 is not only connected to the upper end of the case 1 by means of a flange 4, but can be connected an upper piping well known in the art (not shown) by means of a flange 6 so that the tubular case is also allowed to communicate with the upper piping. Numeral 7 designates a flow passage provided through the case 1. Numeral 8 designates a pipe for supplying gas such as air or the like to be used for backwashing filter elements (described hereinafter) into the case 1. The portion of the case 1 designated by numeral 1*a* is preferably made of nonmagnetic material, while those portions of the case 1 designated by numerals 1*b* and 1*c* are preferably made of magnetic material. Numeral 10 designates a space in the case 1 for housing filter elements. This space 10 includes an upper small-dimensioned space 12 and a lower small-dimensioned space 11 in each of which to locate a filter element shown in FIG. 3. The filter element 13 is formed of a plurality of wire nets 14 of magnetic material and firmly united in one body by bolts 15*a* and nuts 15*b* which both are of nonmagnetic material. However, it may be that the filter element 13 is not shaped into a wire-net construction, but may be of other wellknown construction, such as a number of magnetic wires of very small diameter arranged in parallel with one another or steel wool. If such a material is employed as the filter element 13, the material is to be held by and between a pair of means which allow fluid material to pass therethrough, such as wire nets or porous plate, and to be disposed in each housing space 11 or 12 in this condition. These housing spaces 11 and 12 each may be so dimensioned that, for example, the diameter is approximately 1,000 millimeters and the height is approximately 100 millimeters. A pair of pole pieces 16 and 17 are vertically opposed to each other with the entire housing space 10 located therebetween. The pole pieces 17 and 16 are provided with a number of vertical openings or passages 19 and 18, respectively, which allow a stream of fluid (to be filtered or already filtered) to flow therethrough. Outside the case 1, a magnetic-field producing means 20 is connected to the same case 1. As is well known in the art, this means 20 comprises a yoke 21 and an electromagnetic coil 22. This coil 22 is housed in a casing 22*a* to protect the coil 22 from liquid. The entire filter-element housing space 10 is roughly divided by a circular dispersion plate 24 into upper and lower halves which provide the foregoing upper and lower small-dimensioned housing spaces 12 and 11, respectively. The dispersion plate 24 is of magnetic material and, as in the pole pieces 16 and 17, is provided with a number of passages 25 which allow a stream of fluid (to be filtered) to flow therethrough. A circular or cylindrical shunt means 26 is connected to the circumference of the plate 24, and rests on the circumference of the upper surface of the lower pole piece 16. The shunt means 26 is also of magnetic material and has such a small-sized cross section (at right angles to the direction of the flow of fluid) that only a limited number of lines of magnetic force of all those lines produced by the coil 22 and passing the lower pole piece 16 are allowed to pass through the shunt means 26. Numeral 27 designates spacers to be used for locating two filter elements 13 between the upper pole piece 17 and the dispersion plate 24 and between the same plate 24 and the lower pole piece 16, respectively.

In the foregoing construction, when the coil 22 is energized, a low magnetic field is produced in the lower filter region 11, while a high magnetic field is produced in the upper filter region 12, as follows: The greater part of the lines of magnetic force produced by the coil 22 and passing the lower pole piece 16 are allowed to pass through the shunt means 26 to reach the dispersion plate 24, so that the shunt means 26, being of a small-sized cross section, is magnetically saturated; therefore, the remianing lines of magnetic force produced by the coil 22 are not allowed to pass the shunt means 26, but travel from the lower region 11. Then both lines of magnetic force having reached the plate 24 through the shunt means 26 and those through the lower region 11 all come from the plate 24 to the upper pole piece 17 through the upper region 12. Therefore, a smaller number of lines of magnetic force are distributed in the lower region 11 so that the region 11 has a weaker magnetic field, while a larger number of them are distributed in the upper region 12 so that the region 12 has a stronger magnetic field. The lines which come to the plate 24 through the lower region 11 pass the same region 11 evenly (i.e., do not come together in groups through the region 11), and all the lines having reached the plate 24 (through the region 11 and the shunt means 26) evenly comes from the dispersion plate 24 (or its upper surface **24*b*) into the upper region, so that the magnetic force is evenly or uniformly spread in each entire region (11 or 12). The magnetic fields thus produced in the two regions 11 and 12 may be of an intensity of, e.g., 1 kOe (0.1 $Wb/m^2$) and 3 kOe (0.3 $Wb/m^2$), respectively. The magnetomotive force required for producing the magnetic fields of such intensities is approximately 32,000 AT, which is approximately the same as that required for producing a magnetic field of medium intensity (2 kOe) and with an even distribution of magnetic force in the entire filter region 10 (which is the case with the prior art). Also, the thickness of the shunt means 26** required for producing the magnetic fields of the foregoing intensities is approximatelty 25 millimeters.

The filter elements 13 located in the regions 11 and 12 are magnetized by the magnetic fields produced in the two regions in the foregoing manner.

With the filter elements 13 thus magnetized, a stream of fluid containing magnetic particles is allowed to enter the case 1 from an inlet and flow into the front region 11 through the flow passages 18. In this region 11, those of greater sizes or high susceptibility of the magnetic particles in the fluid are attracted by the front filter element 13. Then the fluid flows into the rear region 12 through the flow passages 25 of the dispersion plate 24. In this region 12 having the foregoing stronger magnetic field, the magnetic particles not attracted by the front element 13, i.e., those of small or very small sizes or of low susceptibility, are attracted by the rear filter element 13. The fluid thus purified flows through the passages 19 and comes from an outlet 5.

As mentioned above, the front and rear regions 11 and 12 attract different types of magnetic particles; therefore, the filter as a whole has an extremely increased capacity for attracting the particles.

When a great number of magnetic particles have been attracted by the two elements 13 (i.e., the predetermined period of time has been elapsed or the flow resistance has reached the predetermined value), the elements are to be washed (for example, backwashed). The first step for starting the washing is to deenergize the coil 22 to remove the magnetic fields from the two regions 11 and 12. Then, water is allowed to enter the case 1 from the pipe 5. At the same time, gases may be supplied from the supply pipe 8 into the case 1, as required. Since the magnetic fields have been removed, the particles attracted by the elements 13 are separated therefrom into the backwash water. And the water thus containing the particles comes from the pipe 2. The washing of the filter elements may be made not by reversing the flow of water in the foregoing manner, but by flowing water from the lower pipe 2 to the upper one 5. If the magnetic particles contained in the fluid to be filtered are of a uniform size, the particles attracted by the front filter element 13 are different from those attracted by the rear one 13 in their susceptibility; therefore, in such a case, if the filter elements 13 are removed from the case 1 without washing them, the separation and recovery of the particles of different materials are effected.

Figure 4:
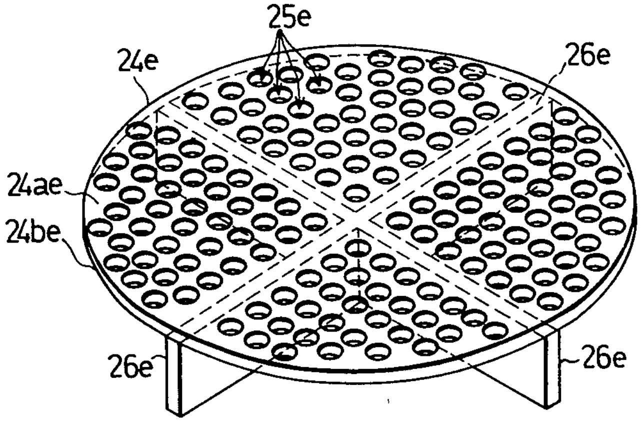
FIGS. 4 to 6 show different constructions of shunt means which may be used in the separator of FIG. 1.

Referring to FIG. 4, the shunt means may be a cross-shaped one **26*e* instead of the preceding circular or cylindrical one 26. This shunt means 26*e*** also is of such a cross section as provides the same performance as mentioned before. In this second construction of shunt means and those that will follow, portions or sections identical or similar to those of the preceding construction in function are designated by the same numerals as the preceding ones and the alphabetical letters e, f, and g attached thereto.

Figure 5:
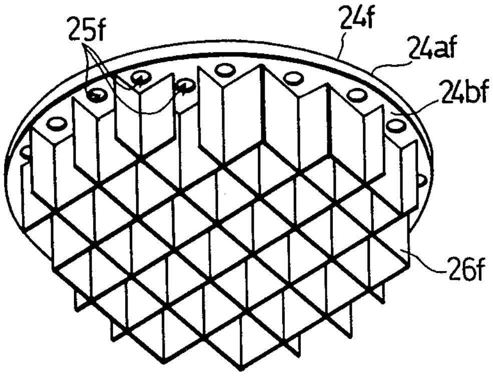
Figure 6:
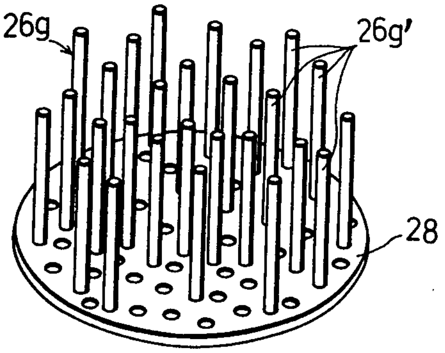

Moreover, the shunt means may be shaped into a honeycomb as shown in FIG. 5. This shunt means **26*f*** is constructed of plates of small thickness.

By constructing the shunt means into shuch a shape **26*f***, the higher magnetic field may be made one of uniform intensities.

Furthermore, the shunt means may be constructed of a number of projections **26*g*' erected on a base plate 28 to be placed on the lower pole piece 16**.

When such a shunt means **26*g* is employed, lines of magnetic force are evenly discharged from the upper ends of the projections 26*g*' towards the upper pole piece 17, so that no dispersion plate 24** may be required.

Figure 7:
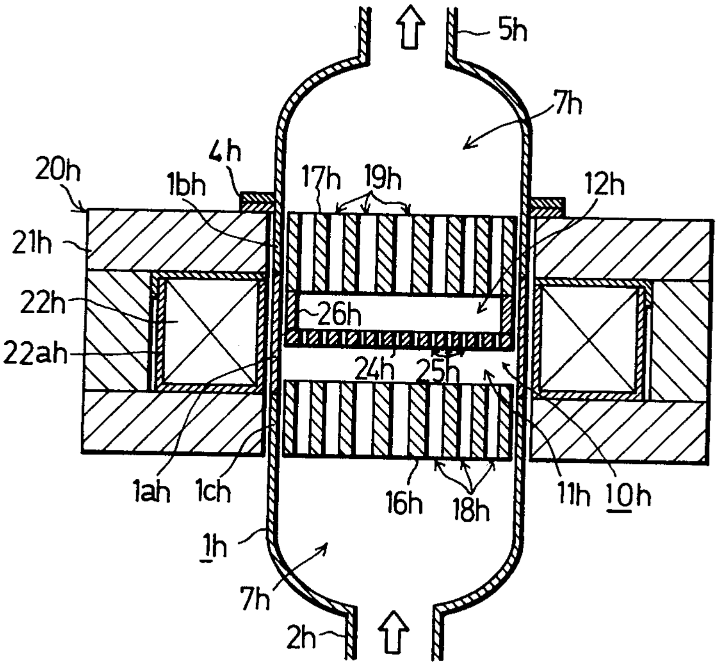
FIG. 7 is a similar view to FIG. 2 wherein the positions of filter region with a higher magnetic field and that with a lower magnetic field are reversed as compared with those in FIG. 2.

FIG. 7 shows another embodiment of magnetic separator, i.e., one which is so constructed that a front filter region **11*h* has a stronger magnetic field, while a rear filter region 12*h* has a weaker one. In such a construction, a fluid allowed to enter a case 1*h* as indicated by an arrow is first filtered in the stronger region 11*h* which has a higher capacity for attracting magnetic particles as compared with the prior art wherein a magnetic field of uniform intensities is formed in the entire filter region 10*h***. Therefore, a greater number of magnetic particles contained in the fluid are attracted by the filter element located in the front region 11*h*. If a mass or masses of the particles are separated from those attracted by the front element by the flow of fluid or for other reason, those masses can be almost certainly attracted by the rear filter element in the second region 12*h*; that is, since such masses are of larger size, they can be attracted in full measure by the element located in the region of weaker magnetic field. Therefore, the type of magnetic particles attracted by the front region 11*h* is different from that attracted by the rear region 12*h*, so that such a construction as a whole has an increased capacity for attracting the particles.

It is to be understood, in the foregoing description, that the adjectives "upper" and "lower" preceding the terms such as the filter elements and the like do not hold good unless the separator is located as illustrated in FIGS. 1, 2, or 7.

As many apparently widely different embodiments of this invention may be made without departing from the spirit and scope thereof, it is to be understood that the invention is not limited to the specific embodiments thereof except as defined in the appended claims.

What is claimed is:

1. In a magnetic separator comprising (a) a tubular case having a passage to allow a fluid to be filtered to flow through said case and a region in which to locate filter elements across said flow passage, (b) filter elements of magnetic material located in said region, (c) a pair of pole pieces spaced apart from each other along said flow passage and with said region located therebetween and each pole piece having a plurality of openings to allow said fluid to flow through said pole pieces, and (d) an electromagnetic coil for producing magnetic fields through said pole pieces, an improved construction wherein:

i. said region is divided along said flow passage into a pair of smaller-dimensioned spaces;

ii. a filter element is located in said each smaller-dimensioned space; and iii. a shunt means of small cross section is provided in one of said smaller-dimensioned spaces, which means is adapted to allow a portion of the lines of magnetic force produced by said coil and to be conveyed through said pole pieces into said one of smaller-dimensioned spaces to pass therethrough so that a weaker magnetic field is produced in said one of smaller-dimensioned spaces, while a stronger magnetic field is produced in the other smaller-dimensioned space.

2. A construction of claim 1 wherein said tubular case is provided with an inlet to allow said fluid to enter said case and an outlet to discharge said fluid from said case and said shunt means is disposed in one of said smaller-dimensioned spaces located nearer to said inlet than the other smaller-dimensioned space.

3. A construction of claim 1, wherein said tubular case is provided with an inlet to allow said fluid to enter said case and an outlet to discharge said fluid from said case and said shunt means is disposed in one of said smaller-dimensioned spaces located nearer to said outlet than the other smaller-dimensioned space.

4. A construction of claim 1, 2, or 3 wherein a circular dispersion plate of magnetic material is located between said two smaller-dimensioned spaces, said plate being provided with a plurality of openings to allow said fluid to pass through said plate.

5. A construction of claim 4 wherein said shunt means is shaped into a cylinder projecting from the circumference of said dispersion plate towards one of said pole pieces.

6. A construction of claim 4 wherein said shunt means is shaped into a honeycomb projecting from one surface of said dispersion plate towards one of said pole pieces.

7. A construction of claim 1, 2, or 3 wherein said shunt means comprises a plurality of rods projecting from a base plate located on one surface of one of said pole pieces.

* * * * *